United States Patent
Gregory et al.

(10) Patent No.: US 9,940,358 B2
(45) Date of Patent: Apr. 10, 2018

(54) EFFICIENT DATA TRANSFER

(71) Applicant: TERADATA US, INC., Dayton, OH (US)

(72) Inventors: Bret Mathew Gregory, Raleigh, NC (US); Jennifer Lyn Baldwin, Apex, NC (US); Christopher Peter Troullis, Raleigh, NC (US); James Paul Rosengarth, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 587 days.

(21) Appl. No.: 14/580,393

(22) Filed: Dec. 23, 2014

(65) Prior Publication Data
US 2016/0179892 A1 Jun. 23, 2016

(51) Int. Cl.
*G06F 7/00* (2006.01)
*G06F 17/30* (2006.01)
*H04L 29/08* (2006.01)

(52) U.S. Cl.
CPC .... *G06F 17/30469* (2013.01); *G06F 17/3056* (2013.01); *H04L 67/06* (2013.01); *H04L 67/1095* (2013.01)

(58) Field of Classification Search
CPC .................................................. G06F 17/3056
See application file for complete search history.

(56) References Cited

U.S. PATENT DOCUMENTS

| | | |
|---|---|---|
| 2006/0173809 A1 | 8/2006 | Bangel et al. |
| 2007/0094238 A1 | 4/2007 | Mitchell et al. |
| 2008/0275927 A1 | 11/2008 | Bangel et al. |
| 2009/0197575 A1 | 8/2009 | Degraeve |
| 2012/0066263 A1 | 3/2012 | Wilbermuth |

*Primary Examiner* — Ajith Jacob
(74) *Attorney, Agent, or Firm* — Schwegman, Lundberg & Woessner, P.A.

(57) ABSTRACT

A determination is made to co-locate geographical dispersed data of a Relational Database Management System (RDBMS). Costs associated with the direction of moving a portion of the dispersed data from one site to another site are computed. A comparison of the costs is made to determine which direction to move the data to co-locate it at one site for optimal performance of a RDBMS operation.

10 Claims, 4 Drawing Sheets

EFFICIENT DATA TRANSFER

BACKGROUND

Frequently, enterprises are maintaining portions of their information assets at multiple geographically dispersed locations. For example, one facility may need to capture its data locally because that data is used the most frequency by that facility. Sometimes the data relevant to all the facilities of an enterprise are centrally located at a remote, external, and geographical facility. Each facility may have its own data needs, some of which may never be moved to the centrally located facility. Moreover, in some cases, it is more efficient for the data to be distributed across facilities but act together as one data warehouse as a single Relational Database Management System (RDBMS). That is, there are a variety of reasons why enterprise will have data assets geographically distributed and still be capable of issuing queries that access the entire set of data assets from multiple facilities.

However, transferring large amounts of data over network connections is a performance sink. The data may need transferred for a variety of reasons, such as to perform a join operation on two database tables while processing a query where each table is located on different servers over a network that are geographically dispersed. Moreover, each server may be missing one of the tables needed for the join operation. In this example and for the query to process properly, one of the servers needs to transfer its table relevant to a portion of the join operation to the other server having the remaining table relevant to the other portion of the join operation so that the join operation can efficiently process.

Presently, there is no sufficiently intelligent mechanism to select which way the table being transferred over the network should move. Typically, there is likely just a default rule that an enterprise deploys that moves one table in a predefined direction over the network. However, depending upon the type and quantity of data for the table being transferred, this default rule can be a mistake by unnecessarily taxing network bandwidth, resources, and significantly delaying results returned form a query to an end user.

Some existing solutions attempt to alleviate the situation with elaborate caching techniques (which have to be continually updated and flushed to stay up-to-date with the ever changing data).

Therefore, there is a need to more efficiently transfer data in a geographically dispersed database environment when processing queries that rely on geographically dispersed data tables.

SUMMARY

In various embodiments, methods and a system for efficient data transfer are presented. According to an embodiment, a method for efficient data transfer is provided.

Specifically, a determination is made that a database operation needs access to data on a first server and a second server; the first server and the second server are geographically dispersed over a network connection. Costs associated with moving a portion of the data from one of the servers to a remaining one of the servers in performance of a part of the database operation are calculated. Finally, the portion is transferred from the server having a least amount of cost to the server having a greater amount of cost for processing the part of the database operation.

DETAILED DESCRIPTION

Figure 1:
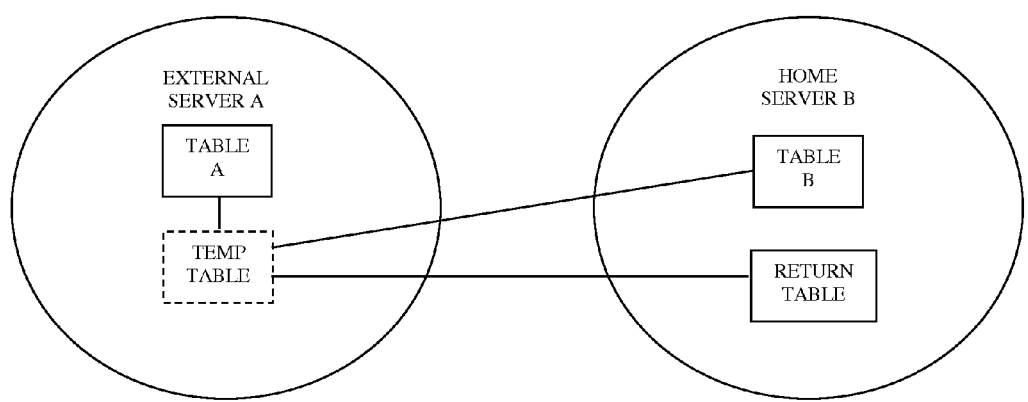
FIG. 1 is a diagram of an example configuration and situation for efficient data transfer, according to an example embodiment.

FIG. 1 is a diagram of an example configuration and situation for efficient data transfer, according to an example embodiment. It is noted that the components of the example configuration are shown in greatly simplified form with just components necessary for understating the embodiments presented herein presented for illustration.

The decision maker as to which direction data is transferred over a geographically dispersed RDBMS is implemented as one or more software modules as executable instructions that execute on one or more processors of a network, where those processors are specifically configured to execute the software modules. For the discussion of the FIG. 1, the software modules are referred to as a "smart transfer agent."

In an embodiment, the smart transfer agent is integrated into one or more components of an interface associated with the RDBMS.

In an embodiment, the smart transfer agent is a component of the Data Anywhere® product, distributed by Teradata®, Inc.

In a RDBMS where data can reside in disparate locations (different servers that are co-located or different servers located in different parts of the world (geographically dispersed)), some operations of the RDBMS may require that the data be co-located in the performance of some aspects of a query being processed against the RDBMS.

The smart transfer agent provides a mechanism to identify where the various portions of data associated with a query being performed in the RDBMS reside, how a portion of the query can be split, which direction to move one portion of the data to have it co-located with the other portion of the data, and reconfigure the split portion of the query to operate on the now co-located data.

Again, a major bottleneck with large-scale geographically dispersed RDBMSs is the transferring of large amounts of data from one network location to another network location in performance of a query against the RDBMS. The smart transfer agent solves this problem in an efficient manner to transfer data over the network in a direction that is optimal in performance of the query.

Initially, the smart transfer agent determines that a portion of a query being processed in a RDBMS requires data that is not co-located (for example a join operation is best for the query that uses the two database tables of the RDBMS). Next, the smart transfer agent obtains a pre-calculated cost for two tables that the smart transfer agent determined were best joined to process a particular portion of the query (could be the whole query as well). The cost (transfer cost) roughly equates to the number of rows within the table having a set of data needed by the query. The transfer cost along with the column data type associated with the join operation is then used to calculate the overall cost of transferring data in the table (first table) being evaluated and located in a first location over a network to a second location, which is not co-located and is geographically dispersed over a network from the first table at the first location. The transfer cost and the overall cost are added together to obtain a first server's transfer cost for the first server having the first table at the first location. This same procedure is repeated for the second table at the second location to obtain the second server's transfer cost in moving the second table over the network to the first location. The two servers' transfer costs are then compared by the smart transfer agent to drive the actual direction that the data from the two tables will move.

In an embodiment, the servers' transfer costs can also be augmented by factors that form a ratio. This is so because one of the servers may include most data for the RDMS (central data location, referred herein to as "home server"), all table definitions for the RDMS, and the application components that process against the RDMS. So, in order to eliminate unnecessary data transfers over the network, the above approach is adjusted to more favorably weight a decision to move data in the direction of the home server; rather than from the home server to the external location. This will ensure that data is only transferred away from the home server when the costs benefits of doing so are greater than the cost of transferring smaller data to the larger data (at the remote site away from the home server), filtering that data (at the remote site), and then transferring that data back to the home server for completion of query processing.

An example situation is now presented to illustrate the processing of the smart transfer agent with reference to the FIG. 1.

The highly simplified depiction of the RDMS in the FIG. 1 includes a home server B having, initially, table B; and an external server A (geographically dispersed from the home server B and not co-located with the home server B). External server A includes, initially, table A.

A query is being processed in the example situation where a query is being processed that needs to query data from both table A and table B. Thus, as discussed above, for this situation the smart transfer agent determines that because table A is geographically dispersed it is more efficient to co-locate the data from tables A and B and then perform the query. A mechanism to do this is to join tables A and B together into a temporary table with a result produced.

The smart transfer agent acquires the transfer costs and the overall costs for each table A and B. Then, the smart transfer agent computes each server's transfer cost. Additionally, each server's transfer cost is then augmented by the ratio associated with costs of moving data from the home server B.

Suppose the tables are configured and have the following costs:
Server A (External Customer Data Warehouse)
   Table A (1,000,000 rows of data) Transfer Cost of 100;
      Column id (integer)
      Column name (varchar 100)
      Column description (varchar 500)
Server B (Home Server)
   Table B (10,000 rows of data) Transfer Cost of 1;
      Column id (integer)
      Column location (varchar 100)
      Column location Description (varchar 500)

If the query conditions defining all data from both table A and table B where A.id=B.id smart transfer agent proceeds as follows based on the above information for the tables:

1. Calculate the Cost of Table A: 100*(1+100+500)=60100;
2. Add up all Table costs for Server B: 601;
3. Add up all Table costs for Server A: 60100
4. Calculate the Cost of Table B: 1*(1+100+500)=601;
5. Apply the Home Server Ratio (2:3)
60100*2=120200; (home server B)
601*3=1803; (external server A)

The smart transfer agent then compares the results after applying the home server ratio and determines how the query should be split and transferred. In this case, the Data from table B (home server B) is selected and transferred to external server A and placed into a temporary table. Then, the query is rewritten where it selects from table A and joins with the new temporary table; the new temporary table was just created by the smart transfer agent. This query is executed and the results will be transferred back to the home server B and stored in a return table appropriate for any segmentation process to continue operating on the data, if so desired.

In an embodiment, the home server ratio is a configurable parameter to the processing of the smart transfer agent.

In an embodiment, the home server ratio is obtained by the smart transfer agent from a database table or known storage location.

In an embodiment, the home server ratio can be dynamically changed while the smart transfer agent executes, such as by updating the known storage location discussed in the latter embodiment (as one example).

Figure 2:
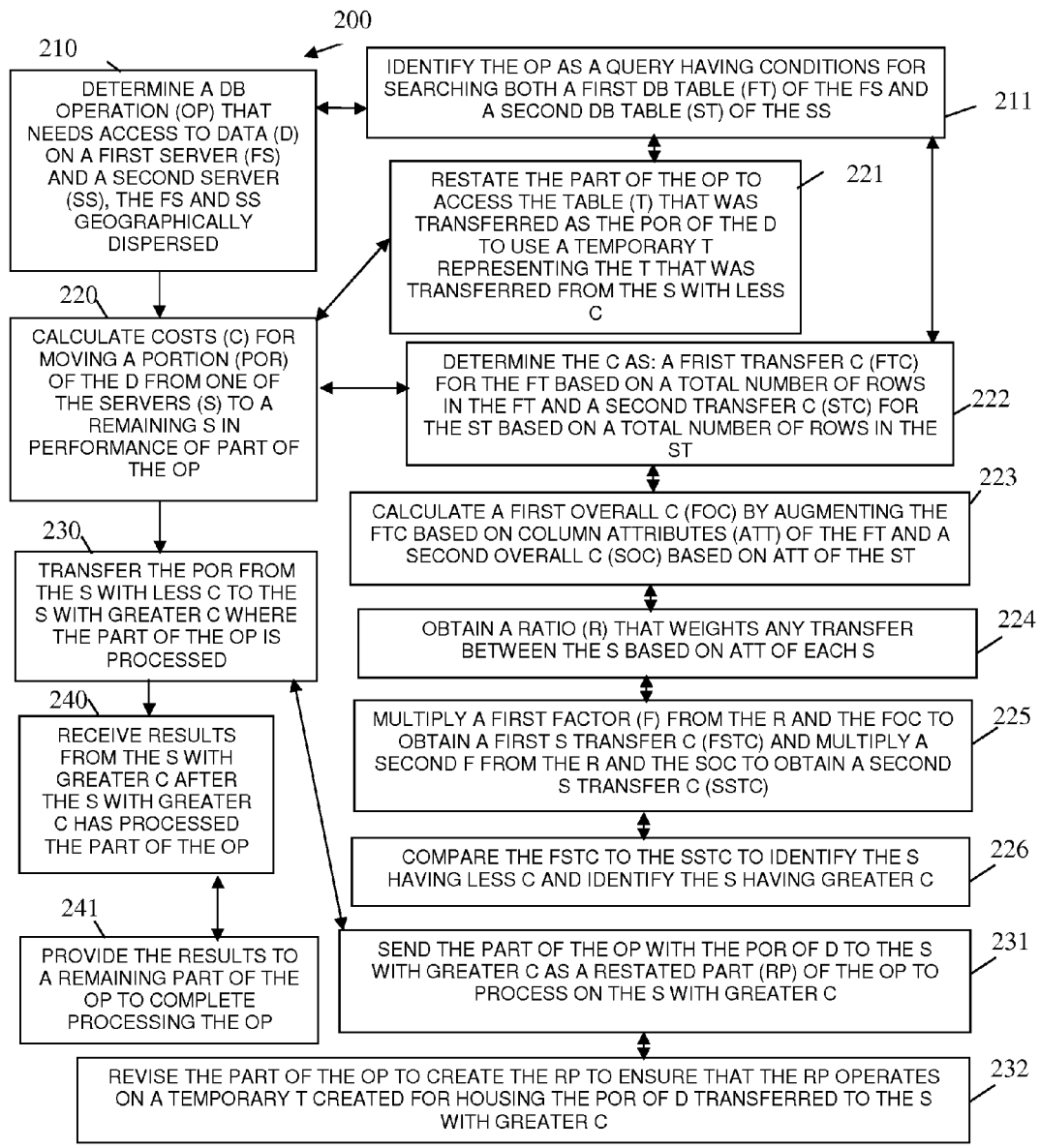
FIG. 2 is a diagram of a method for efficient data transfer, according to an example embodiment.

FIG. 2 is a diagram of a method 200 for efficient data transfer, according to an example embodiment. The software module(s) that implement the method 200 are herein referred to as "smart transfer manager." The executable instructions of the smart transfer manager are programmed in memory and/or non-transitory computer-readable storage medium, which execute on one or more processors (specifically configured to execute the smart transfer manager). Moreover, the smart transfer manager has access to one or more networks (wired, wireless, or a combination of both wired and wireless).

In an embodiment, the smart transfer manager is the smart transfer agent discussed above with reference to the FIG. 1.

In an embodiment, the smart transfer manager processes in parallel with other instances of the smart transfer manager over a massively parallel processing distributed RDBMS, each instance cooperating with the other instance (in some RDBMS transactions requiring the cooperation).

At 210, the smart transfer manager determines a database operation that needs access to data on a first server and a second server. The first server and the second server are geographically dispersed over a network connection from one another. That is, the first and second servers are not co-located.

According to an embodiment, at 211, the smart transfer manager identifies the database operation as a query having conditions for searching both fa first database table of the first server and a second database table of the second server.

At 220, the smart transfer manager calculates costs for moving a portion of the data from one of the servers to a remaining server in performance of part of the database operation.

In an embodiment of 211 and 220, at 221, the smart transfer manager restates part of the database operation to access the table that was transferred as the portion of the data to use a temporary table representing the table that was transferred from the server with the least amount of cost.

According to an embodiment of 211 and 220, at 222, the smart transfer manager determines the cost as: a first transfer cost for the first table based on the number of rows in the first table and a second transfer cost for the second table based on a total number of rows in the second table.

In an embodiment of 222 and at 223, the smart transfer manager calculates a first overall cost based on column attributes of the first table and calculates a second overall cost based on column attributes of the second table. In an embodiment, the augmentation is identifying the data type for the first table column and the data type for the second table column. The data type provides an indication as to the size of the data in the columns, for example an integer may be labeled as having a data size of 1; some column data types define their size (see the example presented above with the FIG. 1). The sum of the sizes for the column data types are added together, and then this sum is multiplied by the number of rows in the table to obtain the transfer cost for a given table. So, the first column data sizes are summed together to get a total first column data size and the total first column data size is multiplied the total number of rows in the first table to get the first overall cost. Similarly, the second column data sizes are summed together to get a total second column data size and the total second column data size is multiple by the total number of rows in the second table to get the second overall cost. This was discussed above or implied above with the illustration of the FIG. 1 and is one mechanism under the embodiment of 223 that can be used to calculate the over cost of each table. The column attributes in this example are the data sizes of the data that populates the column.

In an embodiment of 223 and at 224, the smart transfer manager obtains a ratio that weights any transfer between the servers based on attributes of each server.

In an embodiment of 224 and at 225, the smart transfer manager multiplies a first factor from the ratio and the first overall cost to obtain a first server transfer cost and multiplies a second factor from the ratio and the second overall cost to obtain a second server transfer cost.

In an embodiment of 225 and at 226, the smart transfer manager compares the first server transfer cost to the second server transfer cost to identify the server having the least amount of cost and to identify the server having the greater amount of cost.

The processing discussed at 222-226 was discussed above with reference to the FIG. 1 where an example scenario was presented for comprehension of the calculations.

At 230, the smart transfer manager transfers the portion of the data from the server having the least amount of cost to the server having the greater amount of cost where the part of the database operation is processed.

In an embodiment, at 231, the smart transfer manager sends the part of the database operation with the portion of the data to the server with the greater amount of cost as a restated part of the database operation to process on the server having the greater amount of cost.

In an embodiment of 231 and at 232, the smart transfer manager revises the part of the database operation to create the restated part of the database operation to ensure that the restated part of the database operation operates on a temporary table created for housing the portion of the data transferred to the server with the greater amount of cost. That is, the reference handle for the database operation needs changed because the reference to the portion of data now resides within the environment of the server with the greater amount of cost and not where it originally resided, which was on the server with the least amount of cost.

According to an embodiment, at 240, the smart transfer manager receives results from the server with the greater amount of cost after the server with the greater amount of cost has processed the part of the database operation that it was supposed to process.

In an embodiment of 240 and at 241, the smart transfer manager provides the results to a remaining part of the database operation for that operation to complete its processing on the server having the least amount of cost.

Figure 3:
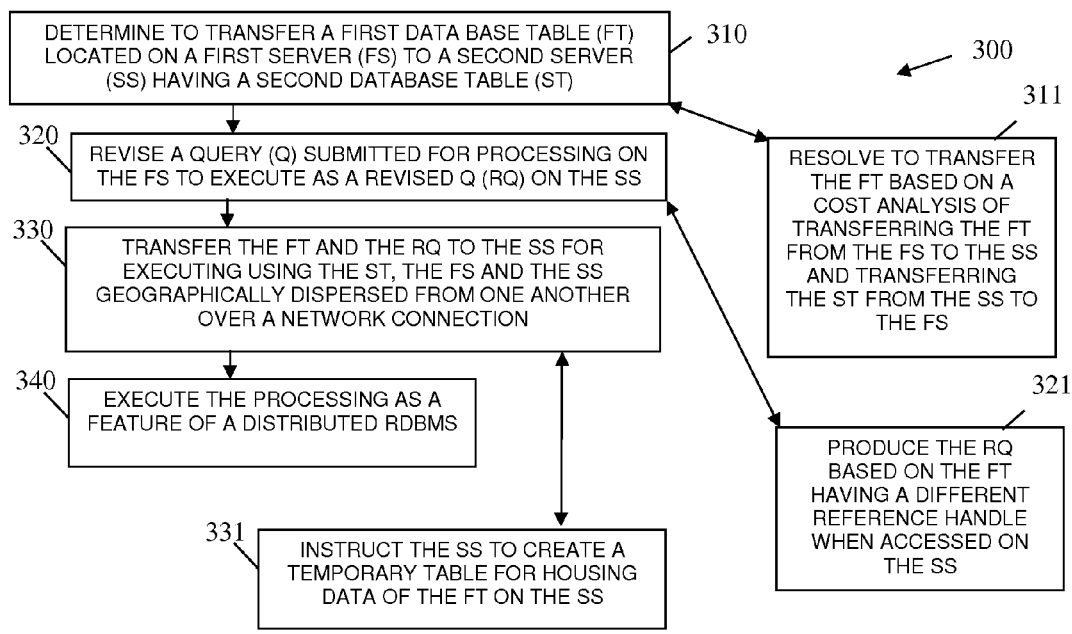
FIG. 3 is a diagram of another method for efficient data transfer, according to an example embodiment.

FIG. 3 is a diagram of another method 300 for efficient data transfer, according to an example embodiment. The software module(s) that implement the method 300 are herein referred to as "data transfer manager." The executable instructions of the data transfer manager are programmed in memory and/or non-transitory computer-readable storage medium, which execute on one or more processors (specifically configured to execute the data transfer manager). Moreover, the data transfer manager has access to one or more networks (wired, wireless, or a combination of both wired and wireless).

The data transfer manager presents another, and perhaps, enhanced processing perspective record linker, presented above with respect to the FIGS. 1 and 2.

In an embodiment, the data transfer manager is the smart transfer agent of the FIG. 1.

In an embodiment, the data transfer manager is the smart transfer manager of the FIG. 2.

In an embodiment, the data transfer manager processes in parallel with other instances of the data transfer manager over a massively parallel processing distributed RDBMS, each instance cooperating with the other instance (in some RDBMS transactions requiring the cooperation).

At 310, the data transfer manager determines to transfer a first database table located on a first server to a second server having a second database table. The first and second servers are not co-located with one another.

In an embodiment, at 311, the data transfer manager resolves to transfer the first table based on a cost analysis of transferring the first table from the first server to the second server and transferring the second table from the second server to the first server.

At 320, the data transfer manager revises a query submitted for processing on the first server to execute a revised query on the second server.

In an embodiment, at 321, the data transfer manager produces the revised query based on the first table having a different reference handle when accessed on the second server.

At 330, the data transfer manager transfers the first table and the revised query to the second server for executing using the second table. The first server and the second server are geographically dispersed from one another over a network connection.

According to an embodiment, at 331, the data transfer manager instructs the second server to create a temporary table for housing data of the first table on the second server.

According to an embodiment, at 340, the data transfer manager executes as a feature of a distributed RDBMS. This was discussed above with reference to the FIG. 1.

Figure 4:
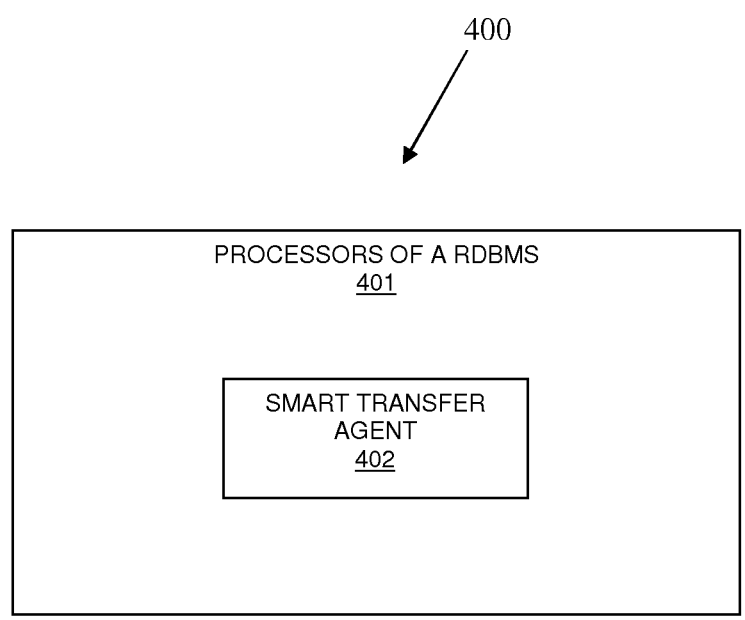
FIG. 4 is a diagram of a data transfer system, according to an example embodiment.

FIG. 4 is a diagram of a data transfer system 400, according to an example embodiment. Some components of the data transfer system 400 are implemented as one or more software modules having executable instructions that are programmed within memory and/or non-transitory computer-readable storage media and that execute on one or more processing nodes (processors) of a network. Further-more, the data transfer system 400 has access to one or more networks. The network is wired, wireless, or a combination of both wired and wireless.

The data transfer system 400 implements, inter alia, the techniques presented above in the FIGS. 1-3, which are incorporated by reference herein with the discussion of the data transfer system 400.

The data transfer system 400 includes at least one processor 301 of a RDBMS and a smart transfer agent 302.

The processor(s) 301 have access to memory and/or non-transitory computer-readable storage media to execute the smart transfer agent 302.

The smart transfer agent 302 is configured to: execute on the processor(s) 301; perform a cost analysis for a direction to transfer a database table in performance of executing a query, the direction being from a particular one of the servers and to a remaining one of the servers; and transfer the database table in the direction to a server having a greater amount of the cost determined by the cost analysis for executing the query on that server.

According to an embodiment, the smart transfer agent 302 is configured to receive results back from the server having the greater amount of the cost in response to executing the query on that server.

In an embodiment of the latter embodiment, the smart transfer agent 302 is configured to provide the results to a database application associated with the query on the server having a least amount of the cost.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   determining, by a processor, a database operation that needs access to data on a first server and a second server, the first server and the second server are geographically dispersed over a network connection, wherein determining further includes identifying the database operation as a query having conditions for searching both a first database table located on the first server and a second table located on the second server;
   calculating, by the processor, costs associated with moving a portion of the data from one of the servers to a remaining one of the servers in performance of a part of the database operation, wherein calculating further includes determining the costs as: a first transfer cost for the first table based on a total number of rows in the first table and a second transfer cost for the second table based on a total number of rows in the second table; and
   transferring, by the processor, the portion from the server having a least amount of cost to the server having a greater amount of cost where the part of the database operation is processed.

2. The method of claim 1, wherein calculating includes restating the part of the database operation to access the table that was transferred as the portion of the data to use a temporary table representing the table that was transferred to the server having the least amount of cost.

3. The method of claim 1, wherein determining further includes calculating a first overall cost by augmenting the first table transfer cost based on column attributes of the first table and calculating a second overall cost by augmenting the second table transfer cost based on column attributes of the second table.

4. The method of claim 3, wherein calculating further includes obtaining a ratio associated with weighting any transfer between the servers based on attributes of each server.

5. The method of claim 4, wherein obtaining further includes multiplying a first factor from the ratio and the first overall cost to obtain a first server transfer cost and multiplying a second factor from the ratio and the second overall cost to obtain a second server transfer cost.

6. The method of claim 5, wherein multiplying further includes comparing the first server transfer cost to the second server transfer cost to identity the server having the least amount of cost and to identity the server having the greater amount of cost.

7. The method of claim 1, wherein transferring further includes sending the part of the database operation with the portion of data to the server with the greater amount of cost as a restated part of the database operation to processing on the server with the greater amount of cost.

8. The method of claim 7, wherein sending further includes revising the part of the database operation to create the restated part to ensure that the restated part operates on a temporary table created for housing the portion of the data transferred to the server with the greater amount of cost.

9. The method of claim 1 further comprising, receiving results from the server with the greater amount of cost after the server with the greater amount of cost has processed the part of the database operation.

10. The method of claim 9, wherein receiving further includes providing the results to a remaining part of the database operation to complete processing of the database operation.

* * * * *